INVENTOR.
Edouard Bost
BY
Pierce, Scheffler & Parker
ATTORNEYS

INVENTOR.
Edouard Bost
BY
Pierce, Scheffler & Parker
ATTORNEYS

Feb. 2, 1965 E. BOST 3,168,664
SEALED ELECTRIC MOTOR
Filed March 13, 1962 4 Sheets-Sheet 3
Fig. 6.
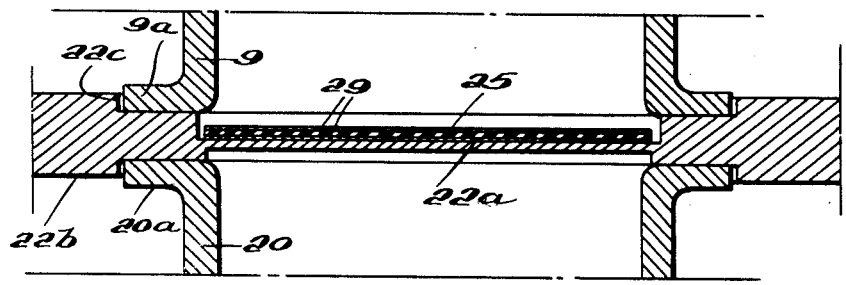
Fig. 7. Fig. 8.
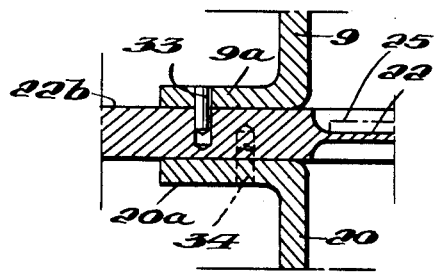 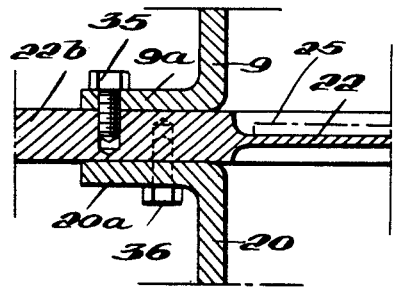
Fig. 9.
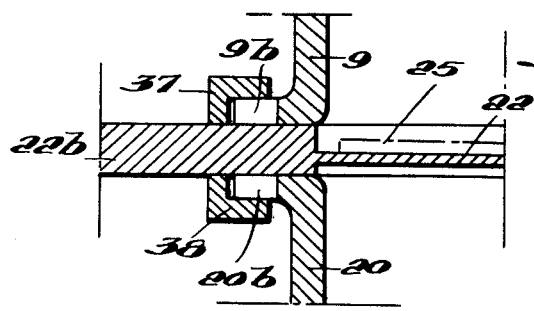
INVENTOR.
Edouard Bost
BY
Pierce, Schiffler & Parker
ATTORNEYS Feb. 2, 1965 E. BOST 3,168,664
SEALED ELECTRIC MOTOR
Filed March 13, 1962 4 Sheets-Sheet 4
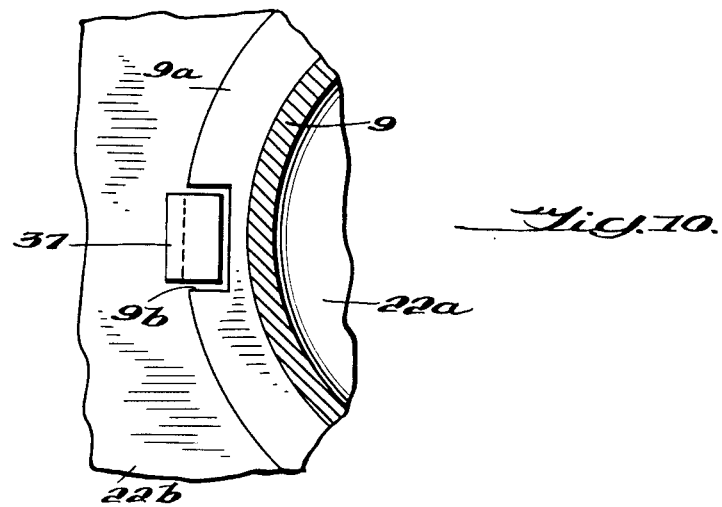
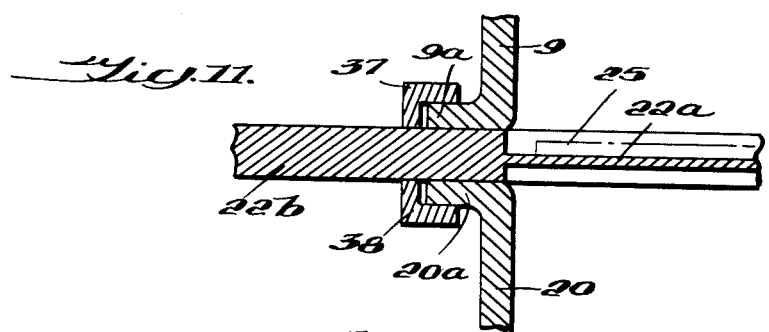
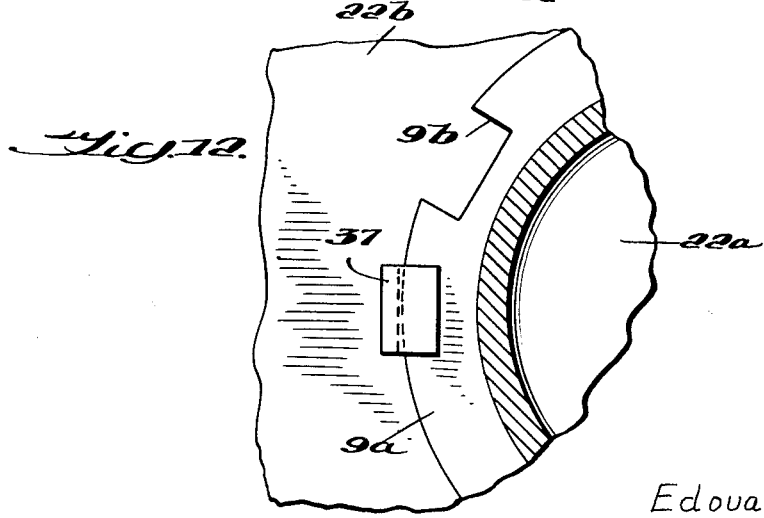
INVENTOR.
Edouard Bost
BY
Pierce, Scheffler & Parker
ATTORNEYS

United States Patent Office 3,168,664
Patented Feb. 2, 1965

3,168,664
SEALED ELECTRIC MOTOR
Edouard Bost, Boulogne-sur-Seine, France, assignor to Cie Electro-Mecanique, Paris, France, a corporation of France
Filed Mar. 13, 1962, Ser. No. 179,447
Claims priority, application France, Mar. 30, 1961, 857,326
9 Claims. (Cl. 310—104)

The present invention relates to electric motors and in particular to those of the sealed type operating on direct current, in which the inductor field is parallel to the axis of rotation and is produced by two rotating inductors which enclose a fixed, i.e. a stationary disk-type armature component.

A motor construction of this type is known wherein the various components are mounted in two casings hermetically separated from each other by means of a fully non-magnetic partition. The stationary armature component which may be constituted by a thin disk of insulating material carrying on opposite faces thereof a flat coil with lamellar conductors, can be supported by the partition member by securing it to one face of the partition member. Each casing contains one of the rotating inductors mounted on a shaft, these shafts being separated by the partition, and their axes being in alignment. In such two-part motors, the various electric and magnetic components can be selected and distributed in such manner that those grouped within one casing part can withstand the action of some fluid such as water in which this part of the motor must be present. A motor construction of this general type is described in a co-pending United States application Serial No. 98,193, filed March 24, 1961, in the name of Robert Dechet, and which is assigned to the same company as in this application.

Because of the fact that the flat armature member is so proximately located with respect to the partition member, the latter may be subjected to such temperature increases as may cause it to become deformed thereby also deforming the armature disk and thus hastening deterioration of the armature due to the small axial gap between it and the rotating inductor.

The object of the present invention is to decrease the possibility of deforming the armature carrying partition member between the two casings and this objective is achieved by an improved construction of the partition member itself. In accordance with the invention, the entire central part of the partition member located substantially facing the armature disk is relatively thin as measured in an axial section while the peripheral part of the partition is relatively thicker, and an expansion junction which may be bent, or cast on or built up, whether or not of the same nature as the rest of the partition, may be provided between the two parts to allow for expansion of the thinner inner part without deformation, the thicker peripheral part possibly extending to the outside of the casings as the rest of the installation may require.

Various embodiments of the improved motor construction will be described and are illustrated in the accompanying drawings. In these drawings:

FIG. 6 is an axial section showing a somewhat different embodiment for the improved, peripherally thickened partition member wherein the peripheral portion of the partition member extends outwardly beyond the peripheral limits of the two casing parts;

FIGS. 7 and 8 are partial axial sections showing two modes for securing the peripheral portion of the partition member between flanges on the two casing parts; and FIGS. 9–12 are views showing still another mode for securing the thickened peripheral part of the partition member in place between confronting flanges on the two casing parts.

Figure 1:
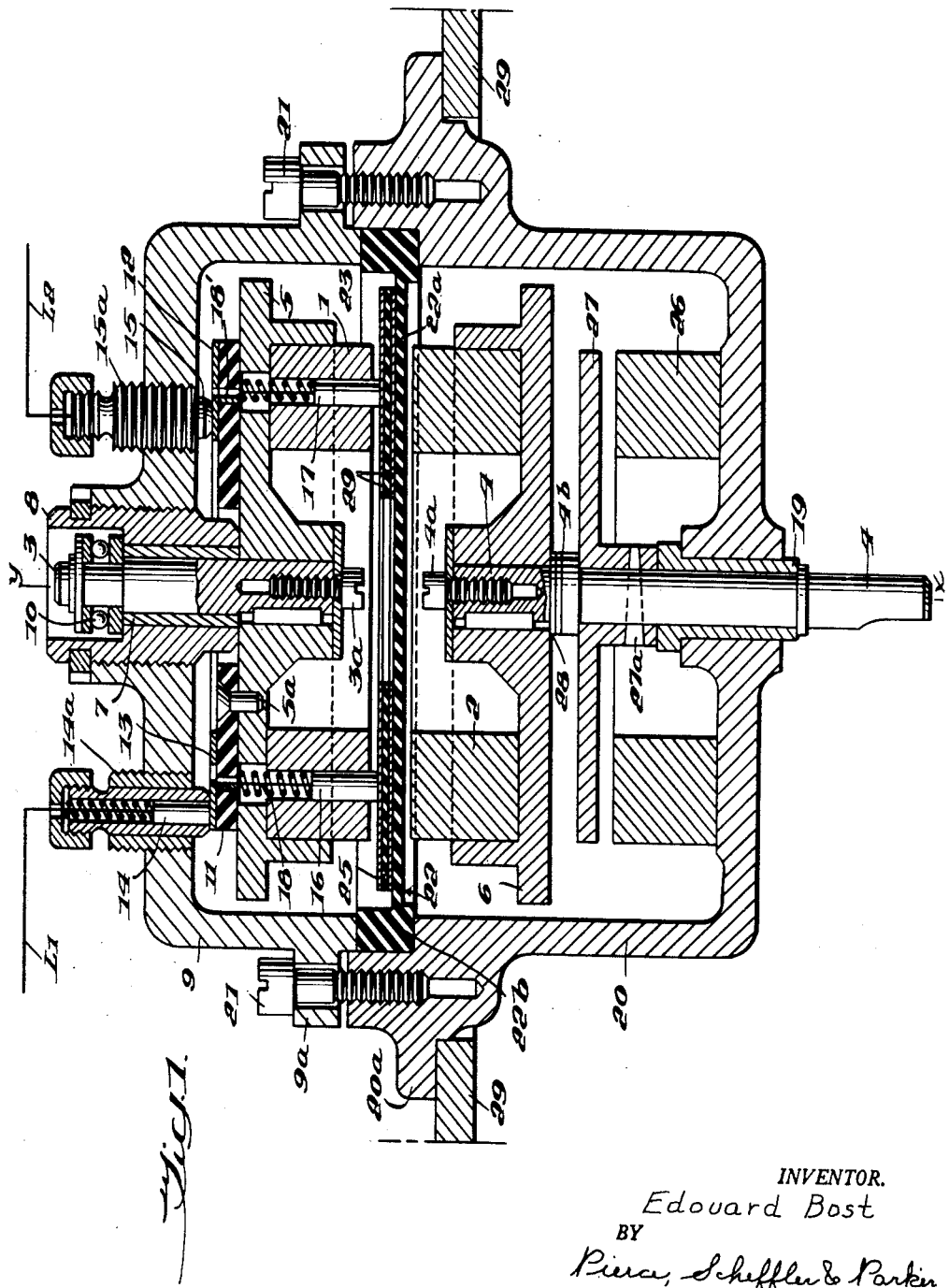
FIG. 1 is a view in central axial section of a complete sealed motor showing one form of the improved partition member incorporating a thickened peripheral portion.

With reference now to the drawings, and in particular to FIG. 1, the sealed motor comprises in general a rotatable inductor member 1 having a smooth toroidal configuration and made from a hard magnetic material such as hard ferrite, the inductor member being magnetized in an axial direction to establish a ring of circumferentially spaced magnetic poles alternating in polarity. The inductor member 1 is secured such as by any suitable adhesive to the underside of a support plate 5 made from a mild steel, concentric about the axis $x$–$y$ of rotation of the motor. Plate 5 which serves to close the magnetic flux path for the inductor member 1, is mounted upon and keyed to a shaft 3 and secured in place by means of a screw 3a which threads into the lower end of shaft 3, a washer being interposed between the head of this screw and the end face of plate 5. Shaft 3 is mounted for rotation within a sleeve type bearing 7 with an oil reserve, this sleeve having a close fit within an axially adjustable bearing support member 8 which is threaded within an end wall of casing part 9 of the two-part casing. A thrust bearing 10 of the ball bearing type is located at the upper end of shaft 3 to absorb axial thrusts in that direction.

Mounted concentrically with axis $x$–$y$ on the upper side of plate 5 by screws 5a is an annular disc 11 of insulating material and on the upper side of disc 11 are secured by suitable means such as an adhesive, outer and inner current collector rings 12, 13, these rings also being arranged concentric with the rotational axis. A spring loaded brush 14 mounted in a supporting structure 14a which in turn is mounted in the end wall of casing part 9 bears against the surface of the outer current ring 12, and a similar spring loaded brush 15 in a support structure 15a also mounted in an end wall of casing part 9 bears against the surface of the inner current ring 13. Current from a suitable source, not shown, is applied to brushes 14, 15 through lead-in conductors L1, L2 which enter the brush supporting structures 14a, 15a in a sealed manner.

Another pair of spring loaded brushes 16, 17 are arranged within diametrically opposite bores in the annular magnetized inductor member 1 and these brushes are electrically connected respectively to the current rings 12, 13 by conductors 18 and 18'. It will thus be seen that the upper part 9 of the two-part casing encloses the rotary inductor assembly comprising shaft 3, magnetized inductor member 1, support plate 5, current rings 12, 13 and brushes 16, 17.

The other casing part 20 contains the other rotary inductor member 2 which is of the same construction as inductor member 1. The annular inductor member 2 is suitably secured such as by an adhesive to the upper side of support plate 6 made from said mild steel concentric about the rotational axis. Plate 6 which serves to close the magnetic flux path for the inductor member 2 is mounted upon and keyed to motor drive shaft 4 by means of a screw 4a which threads into the upper end of shaft 4, a washer being interposed between the head of this screw and the end face of plate 6. Shaft 4 is mounted for rotation within a journal sleeve 19 which requires no lubrication, this sleeve being made, for example, from nylon and fitted into the end wall of the casing part 20. To facilitate adjustment of the axial position of rotary inductor member 2, washers such as indicated at 28 can be disposed between plate 6 and shoulder 4b of shaft 4.

To avoid any displacement of the inductor member 2 toward inductor member 1, the motor is provided with an annular member 26 also made from a hard ferrite material and magnetized axially, and which is secured by suitable means such as an adhesive, to the inner face of the end wall of casing part 20. The magnetized member 26 surrounds shaft 4 and is positioned concentrically with the rotational axis. Disposed above member 26 is a circular disk 27 of ferro-magnetic material which is of substantially the same diameter as the outer diameter of member 26 and which is secured by pin 27a to shaft 4 so as to rotate with the latter.

The casing parts 9 and 20 are suitably connected together by a plurality of machine bolts 21 which extend around the periphery of the casings and pass through flange portions 9a and 20a of the latter. The motor can be supported by a wall 29 on which rests the flange 20a.

Separating the interior of casing part 9 from the interior of casing part 20 is an imperforate, non-magnetic partition member 22 which can be made from electrically insulating material. In accordance with this invention, the partition member 22 is made relatively thin throughout the area 22a which is coextensive with the area of the armature member 25 but has a much thicker peripheral portion 22b which is secured in place between two confronting end faces of the casing parts 9 and 20.

Secured to the upper face of partition member 22a such as by means of an adhesive is the armature member 25 in the form of an annular disk made from insulating material and which is provided on opposite faces thereof with a stationary flat type armature winding 29 made from bare lamellar type conductors which are contacted by the brushes 16, 17, which latter bring to this armature winding the feed current supplied to conductors L1 and L2 previously referred to.

FIGS. 2–5 show modifications wherein an expansible connection 30 is provided at the junction of the thin inner partition part 22a with the thicker peripheral part 22b. This connection considerably improves the tightness of the partition in that it plays substantially the part of an expansion bend. It may be obtained by bending, or it may be cast with the partition, or may be built up between the central part 22a and the peripheral part 22b. These two parts 22a, 22b and the said connection may or may not be made from the same material.

Figure 2:
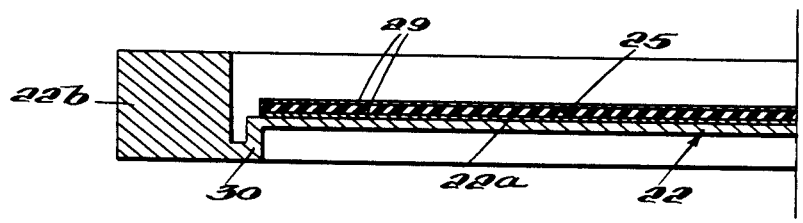
FIGS. 2–5 are partial axial sections showing modified constructions for the peripherally thickened partition member.
Figure 3:
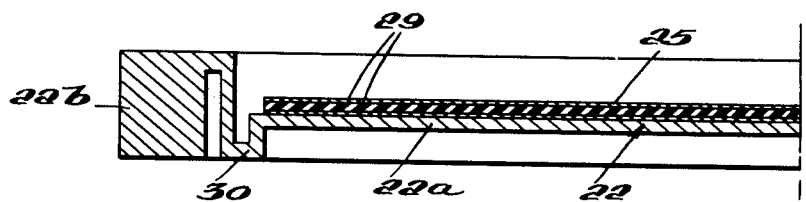
Figure 4:
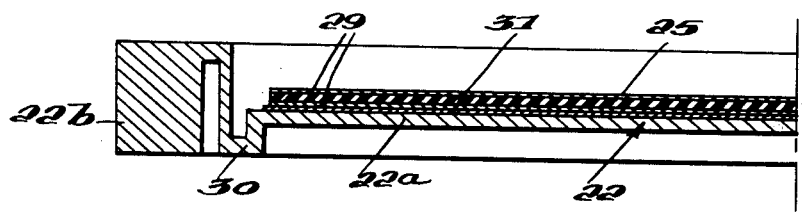
Figure 5:
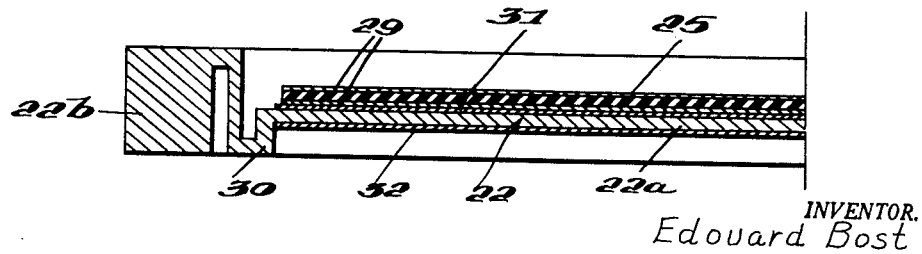

In FIGS. 2, 3, the armature element 25 is glued directly to the thin central part 22a of the partition. In FIG. 4, the partition part 22a is reinforced by a stiffening disk 31 which is placed between armature 25 and partition part 22a. In the embodiment according to FIG. 5, a further stiffening disk 32 is secured to the opposite face of the partition part 22a, in addition to the stiffening disk 31 placed between armature 25 and the partition part 22a as in FIG. 4. The partition 22, its expansion connection 30, and the stiffening disks 31, 32 may be of different materials, for example, laminated and impregnated such as glass fibers impregnated with epoxy resins, bakelized paper, Plexiglas, etc.

In the embodiments which are shown in FIGS. 6–12, the partition member 22 extends to the exterior of the casing parts 9, 20 in such a manner that the latter are entirely separated from each other and mounted on that part 22b of the partition having the greater thickness. In order that this partition may remain tight, it must not be traversed from side to side.

For this purpose, the casing parts may be maintained at a suitable spacing from each other solely by the magnetic attraction which exists between the magnetic members in the casings, either the attraction which exists between the two rotary inductors, or that originating from any other organs provided for that purpose. FIG. 6 illustrates an embodiment of this kind in which the partition member 22 is structurally similar to that of FIG. 1. The centering of the two casing parts 9, 20 will be ensured by a simple peripheral shoulder arrangement 22c on opposite faces of the peripheral part 22b in cooperation with the peripheries of the casing flanges 9a, 20a.

In the embodiment according to FIG. 7, feet 33 integral with a flange portion 9a of casing 9 are entered into corresponding recesses in the upper face of the peripheral part 22b of the partition, and in a similar manner feet 34 integral with a flange portion 20a of casing part 20 are entered into corresponding recesses in the lower face of the partition part 22b. This arrangement prevents any relative angular displacement between the casing parts 9 and 20.

The embodiment of FIG. 8 is similar to that of FIG. 7 except that stud bolts 35 and 36 are used to interconnect the flange portions of the casing parts 9 and 20 with the partition part 22b located therebetween.

Finally, FIGS. 9–12 illustrate an embodiment of the invention wherein the two casing parts 9 and 20 are held in their proper relationship with the partition part 22b located therebetween by means of flanges secured to the partition part 22b which interlock with flange portions 9a and 20a of the casing parts 9 and 20. In particular, a plurality of flanges 37, for example, three, may be spaced uniformly apart around the circumference of the partition part 22b on the upper face thereof and a similar plurality of flanges 38 are located on the lower face of partition part 22b in alignment with the upper flanges 37. The flanges 37, 38 may be secured in any suitable manner to the faces of the partition part 22b such as by glueing. As shown in FIGS. 10 and 12, the flange portion 9a, and also, of course, flange portion 20a, includes a like plurality of cut-out portions 9b, 20b of substantially the same size and circumferential spacing as the flanges 37, 38. To assemble the casing parts 9 and 20 with the partition part 22b therebetween, these parts are brought together with the flanges 37, 38 positioned in corresponding cut-out portions 9b, 20b, as shown in FIGS. 9 and 10. The casing parts 9 and 20 are then rotated together relative to the partition part 22b to the position shown in FIGS. 11 and 12 such that the flanges 37, 38 will then interlock with the flanges 9a and 20a.

In conclusion, it is to be understood that various modifications may be made in the construction and arrangement of the component parts of the motor without, however, departing from the spirit and scope of the inventive concept as defined in the appended claims, particularly with regard to the arrangement of the rotary inductor members themselves.

I claim:

1. In a sealed electric motor in which the armature is disk-like and stationary and the inductor field is parallel to the axis and produced by two rotating inductors mounted on two different shafts whose axes are aligned, the casing of said motor further including a partition hermetically separating each said inductor and its associated shaft and said armature being secured to said partition, the improvement wherein the outer peripheral portion of said partition is thicker than the entire central portion thereof to which said armature is secured and said partition includes an expansion junction between the said central and outer portions thereof.

2. A sealed electric motor as defined in claim 1 wherein said expansion junction is established by a bend in the partition material at said junction.

3. In a sealed electric motor the combination comprising a pair of casing members having flange portions arranged in confronting relation, a partition member hermetically separating the interiors of said casing members each from the other and located adjacent said flange portions, said partition member including a thin portion located radially inward from said flange portions and a relatively thicker outer peripheral portion located between said flange portions, said partition also including an expansion joint between its inner thinner and outer thicker portions, a disk-like armature member secured to one face of the inner thin portion of said partition, a first annular inductor member mounted in one of said casing members for rotation about an axis perpendicular to the plane of said armature member, rotary brush means engaging said armature disk, a second annular inductor member mounted in the other casing member for rotation about an axis coaxial with the axis of rotation of said first inductor member, means securing the flange portion of one of said casing members to the adjacent side of the thicker peripheral portion of said partition member, and means securing the flange portion of the other casing member to the opposite side of the thicker peripheral portion of said partition member, each said securing means extending at most only part way through the said thicker peripheral portion of said partition member.

4. A sealed electric motor as defined in claim 3 wherein each said securing means is constituted by foot portions integral with the flange portion of the corresponding casing member and which extend into and partly through said thicker peripheral portion of said partition member.

5. A sealed electric motor as defined in claim 3 wherein each said securing means is constituted by stud bolts extending through the flange portion of the corresponding casing member and which extend into and partly through said thicker peripheral portion of said partition member.

6. A sealed electric motor as defined in claim 3 wherein each said securing means is constituted by flanges secured to the corresponding face of the thicker peripheral portion of said partition member and which interlock with the flange portion of the corresponding casing member.

7. A sealed electric motor as defined in claim 6 wherein the flange portion of each said casing member is provided with a series of cut-outs for receiving the flanges on said thicker peripheral portion of said partition member, said flanges then being interlocked with the flange portions of said casing members by relative rotation therebetween.

8. In a sealed electric motor the combination comprising a pair of cup-shaped casing members arranged in confronting relation, a partition member between said casing members and hermetically separating the interiors of said casing members each from the other, said partition member including a thin portion located radially inward from the peripheries of said casing members and a relatively thicker outer peripheral portion extending beyond the peripheries of said casing members, said partition member also including an expansion joint between its inner thin and outer thicker portions, a disk-like armature member secured to one face of the inner thin portion of said partition member, a first annular inductor member mounted in one of said casing members for rotation about an axis perpendicular to the plane of said armature member, rotary brush means engaging said armature disk, and a second annular inductor member mounted in the other casing member for rotation about an axis coaxial with the axis of rotation of said first inductor member, said casing members being held together by the magnetic attraction existing between said first and second inductor members.

9. A sealed electric motor as defined in claim 8 and which further includes means cooperative with said casing members and said partition member for centering said casing members to maintain the respective rotational axes of said inductor members in alignment.

References Cited by the Examiner

UNITED STATES PATENTS

| | | | |
|---|---|---|---|
| 2,534,520 | 12/50 | Katcher | 310—268 X |
| 2,680,203 | 6/54 | Zozulin et al. | 310—94 |
| 2,700,343 | 1/55 | Pezzillo | 310—268 X |
| 2,782,721 | 2/57 | White | 310—268 X |

MILTON O. HIRSHFIELD, *Primary Examiner.*